UNITED STATES PATENT OFFICE.

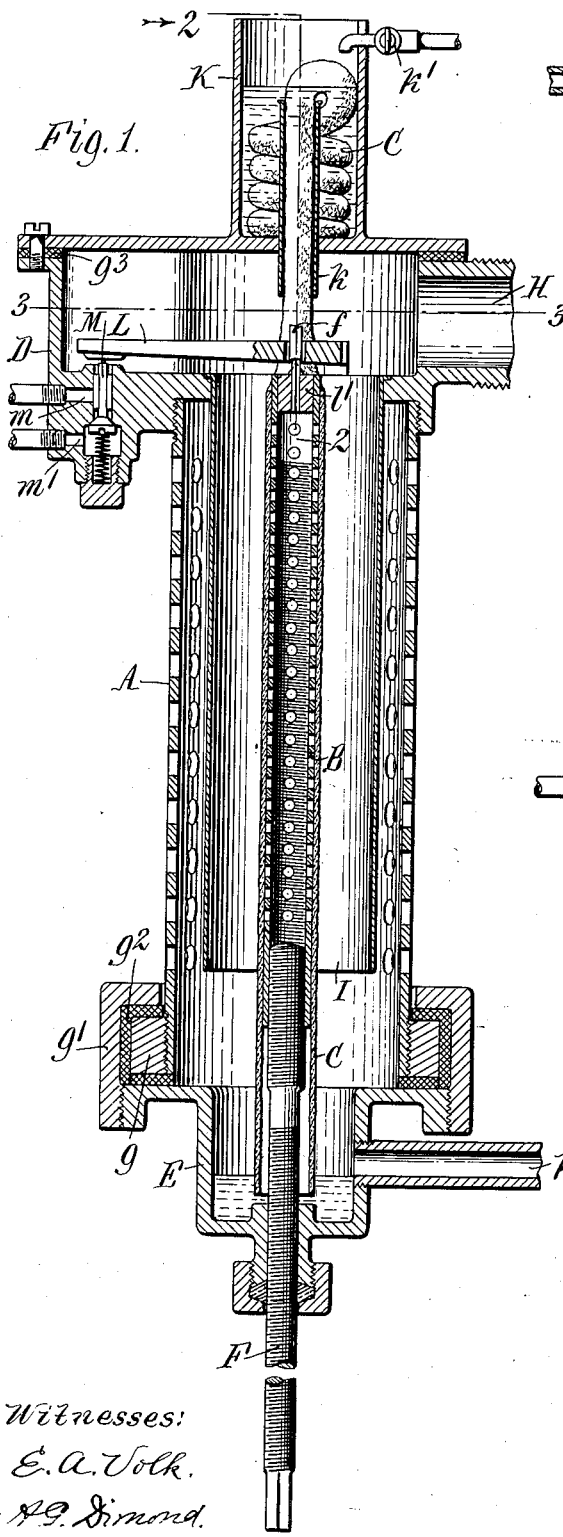
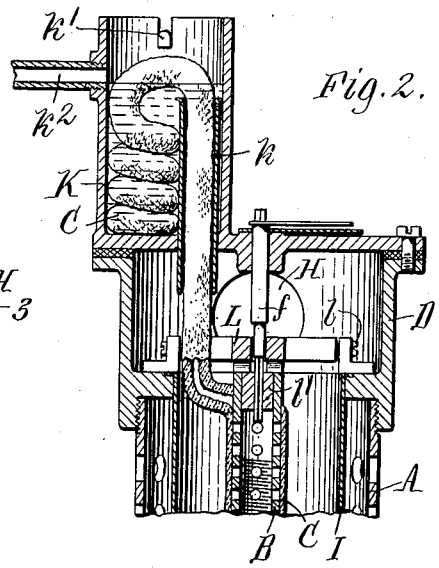
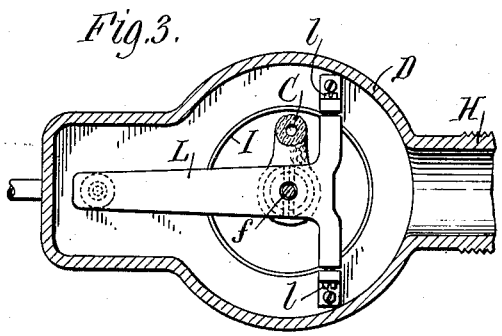

WILLIS H. CARRIER, OF BUFFALO, NEW YORK, ASSIGNOR TO BUFFALO FORGE COMPANY, OF BUFFALO, NEW YORK.

DIFFERENTIAL THERMOSTAT.

No. 896,690.

Specification of Letters Patent.

Patented Aug. 18, 1908.

Application filed October 11, 1907. Serial No. 396,983.

*To all whom it may concern:*

Be it known that I, WILLIS H. CARRIER, a citizen of the United States, residing at Buffalo, in the county of Erie and State of New York, have invented a new and useful Improvement in Differential Thermostats, of which the following is a specification.

This invention relates to a differential thermostat which is influenced by the temperature and hygrometric condition of the atmosphere surrounding it, and it is utilized primarily for regulating the relative humidity of the air in factories or elsewhere.

The thermostat operates upon the principle of the psychrometer, or wet bulb hygrometer, *i. e.*, it has an element, corresponding to the dry bulb of the psychrometer, which is affected directly by the temperature of the surrounding air and another element which is insulated from the first and is subjected to the lower temperature produced by the evaporation of a moist body in its immediate vicinity. The moist body evaporates more rapidly in proportion as the air is drier and the temperature of the body sinks in consequence of this evaporation. The two elements of the thermostat are consequently influenced respectively by the different dry and wet bulb temperatures of the air and will expand or contract differentially so that the position of a device operated by their conjoint action will depend upon the relation existing between the temperature and humidity of the air. Preferably the thermostat elements act differentially on a device by which the humidity of the air in the apartment in which the thermostat is located can be increased or decreased to secure a desired relative humidity. If the coefficients of expansion of the two thermostat elements bear a fixed relation, the instrument will operate in accordance with a constant wet bulb depression which would give an increasing relative humidity with a rise of temperature, but the device is preferably provided with adjusting means whereby it is possible to vary the ratio of expansion of its elements to correspond to the ratio existing between the variations in the wet bulb depressions and the variations in dry bulb temperatures within the prescribed range and thus obtain an approximately constant percentage of relative humidity for any given range of temperatures. As an illustration, suppose that a constant relative humidity of 60 per cent. is desired for temperatures ranging between 70° and 85° F. The psychrometric tables show that for 60 per cent. relative humidity at 70°, the wet bulb temperature must be $61\frac{1}{2}°$, a depression of $8\frac{1}{2}°$, while for the same humidity at 85° the wet bulb temperature must be $74\frac{1}{2}°$, or a depression of $10\frac{1}{2}°$. Thus for this range there will be a rise of 15° in the dry bulb temperature, and a rise of only 13° in the wet bulb temperature. This ratio of increase in the dry and wet bulb temperatures is approximately the same for all dry bulb temperatures between 70° and 85°, so that for a constant relative humidity of 60% it will be necessary for the thermostat to have elements whose coefficients of expansion bear the ratio of 15 to 13; *i. e.*, such that for every 13 units the dry bulb element expands, the wet bulb element will expand 15 units. This result can be obtained by using two dissimilar metals having a ratio of expansion of 13 to 15, but as the ratio differs for different relative humidities in different ranges of temperature, adjusting means are provided, as before mentioned, for changing at will the ratio of expansion of the two elements.

In the accompanying drawings: Figure 1 is a central sectional elevation of a differential thermostat embodying the invention. Fig. 2 is a sectional elevation of the upper portion thereof in line 2—2, Fig. 1. Fig. 3 is a sectional plan in line 3—3, Fig. 1.

Like letters of reference refer to like parts in the several figures.

The thermostat comprises two expansible elements A and B which are insulated from each other, one element being secured at one end and influenced by the temperature of the surrounding atmosphere, and the other element being connected to the free end of the first element and influenced by a lower temperature caused by the evaporation of moisture from a body or wick of suitable absorbent material C surrounding the same. In the construction shown in the drawings, one element B is arranged concentrically within the other element A, which latter is tubular and perforated and is secured at its upper end to a hollow box or casing D. A cap E is secured to and closes the lower end of the outer element, and the inner element is secured at its lower end to and is supported by this cap. If a single-piece inner element having a fixed coefficient of expansion were used it could be secured to the cap E in any suitable manner, but preferably it has a screw connection with an adjusting screw F which passes through and has a screw engagement with a hole in the cap E. The pitch of the threads engaging the cap and inner element B is the same, so that by holding the element B and turning the adjusting screw one way or the other it will be screwed farther into or out of the element and the effective expansible length of the parts will be changed without shifting the element B lengthwise. Thus by using metals having different coefficients of expansion for the parts B and F, which in reality together form the inner element, it is possible to alter its coefficient of expansion by screwing the adjusting screw farther into or out of the part B. A stem or shaft $f$ extends through a hole in the top of the casing D and has an end of square or other suitable shape loosely engaging in a corresponding hole in the upper end of the inner element, so that the latter can be held or turned by means of the shaft, while the shaft does not interfere with the free expansion and contraction of the element. By holding the adjusting screw F and turning the element B thereon by the shaft $f$, the position of the element relative to the part actuated thereby can be adjusted as required.

The two elements are suitably insulated from each other to prevent the communication of the temperature of one to the other, for which purpose a flange $g$ on the lower end of the inner element is embraced by a coupling ring $g'$ screwed on the cap E, and suitable insulating material $g^2$ is provided between the flanged end of the inner element and the cap E and coupling ring $g'$. A suitable insulating ring $g^3$ is also placed between the body and top of the casing D to further complete the insulation of the two elements.

A pipe H connects the casing D with an exhauster of any suitable sort whereby an upward current of air is produced within the outer element around the inner element, the air entering through the perforations in the outer element. A tube I secured to the casing D and depending into the outer element around the inner element nearly to the lower end thereof, insures an upward draft or current in proximity to the inner element for the greater part of its length, and also serves to partially insulate or separate the air immediately surrounding the inner element from that surrounding and influencing the outer element.

The wick or absorbent body C surrounding the inner element extends from the lower end of the inner element approximately to the upper end thereof, and then laterally and up through a tube $k$ passing through the top of the casing D into a reservoir or receptacle K for water or other suitable liquid for wetting the wick, the upper end of the wick being preferably immersed in the liquid in the reservoir K. The reservoir is supplied with liquid, preferably by a petcock $k'$ which drips thereinto. The reservoir is preferably provided with an overflow passage or pipe $k^2$ located at an elevation slightly above the top of the wick tube $k$ so that the level of the liquid will be maintained above the upper end of the wick tube to give a constant slight head or pressure to the liquid, which assists the capillary action of the wick in keeping the same thoroughly wetted at all times. The cap E is also preferably provided with an overflow or drain passage or pipe $k^3$ above the lower end of the wick, so that a body of liquid is maintained in the cap into which the lower end of the wick dips.

L represents a lever which is fulcrumed in the stationary casing D by pivots $l$, or in any other suitable manner, and is provided with an opening through which the shaft $f$ for the upper end of the inner element passes. A plug $l'$ fixed to the upper end of the inner element is provided at opposite sides with knife edges on which the lever L bears. The thermostat lever L can be connected to suitable means whereby the thermostat can be employed for indicating the relative humidity of the atmosphere in the apartment in which it is located, or for controlling the humidity of the air. As shown, the lever is connected to an ordinary thermostatic valve, indicated at M, which controls the supply of compressed air in a passage $m$ $m'$ leading to means (not shown) for humidifying or dehumidifying the air in the apartment in which the thermostat is located.

The operation of the thermostat is as follows: The wick C around the inner element B—F is kept wet and the air circulated upwardly around the same evaporates the moisture and lowers the temperature of the inner element according to the humidity of the air, and the ratio of expansion of the two thermostat elements, depending upon the humidity of the air, will determine the position of the lever L and consequently the action of the humidity regulating means controlled thereby. By means of the adjusting screw F the ratio of expansion of the elements can be altered to give a constant wet bulb depression with a varying relative humidity with changes in temperature, or a varying wet bulb depression such as to give an approximately constant relative humidity with fluctuations of temperature for the reason before explained.

I claim as my invention:

1. The combination of a thermostat element influenced by the temperature of the surrounding air, a second thermostat element insulated from said first element, means whereby moisture is evaporated in the vicinity of said second element, and mechanical connections between said elements whereby their conjoint action is dependent upon the temperature and hygrometric condition of the air, said elements having different coefficients of expansion, substantially as set forth.

2. The combination of a thermostat element influenced by the temperature of the surrounding air, a second thermostat element insulated from said first element but mechanically connected thereto, and a moist body enveloping said second element whereby its temperature corresponds substantially to the wet bulb temperature of the air, said elements having different coefficients of expansion, substantially as set forth.

3. The combination of a thermostat element influenced by the temperature of the surrounding air, a second thermostat element insulated from said first element but mechanically connected thereto, a moist body enveloping said second element, and means for producing an air current past said moist body, substantially as set forth.

4. The combination of a hollow thermostat element influenced by the surrounding air, a second thermostat element arranged within and insulated from said hollow element but mechanically connected thereto, a moist body enveloping said inner element, and means whereby the air can move in said hollow element around said moist body, substantially as set forth.

5. The combination of a hollow thermostat element having an air inlet and adapted for connection with means for causing the passage of air therethrough, a second thermostat element arranged within and insulated from said hollow element but mechanically connected thereto, and a moist body enveloping said inner element, substantially as set forth.

6. The combination of a hollow perforated thermostat element having means for connection with an air exhauster, a second thermostat element located within and insulated from but mechanically connected to said hollow element, a moist body enveloping said inner element, and a tube within said outer element and surrounding said inner element to form an air passage around the same, substantially as set forth.

7. The combination of a thermostat element influenced by the temperature of the surrounding air, a second thermostat element insulated from but mechanically connected to said first element, means whereby moisture is evaporated in the vicinity of said second element, and means for changing the ratio of expansion of said elements, substantially as set forth.

8. The combination of a thermostat element influenced by the temperature of the surrounding air, a second thermostat element insulated from but mechanically connected to said first element, one of said elements comprising parts having different coefficients of expansion which are adjustably connected for relatively changing the effective expansible lengths of said parts, and means whereby moisture is evaporated in the vicinity of said second element, substantially as set forth.

9. The combination of a hollow thermostat element influenced by the surrounding air, a second thermostat element arranged within and insulated from said hollow element, an adjusting device which has a different coefficient of expansion from said inner element and has screw connections with both of said elements, and a moist body enveloping said inner element, substantially as set forth.

10. The combination of a hollow thermostat element influenced by the surrounding air, a second thermostat element arranged within and insulated from said hollow element but mechanically connected thereto, a wick enveloping said inner element, a reservoir into which the upper end of said wick extends, and means for maintaining liquid in said reservoir at a predetermined level for wetting said wick, substantially as set forth.

Witness my hand, this 7th day of October, 1907.

WILLIS H. CARRIER.

Witnesses:
  C. W. PARKER,
  C. B. HORNBECK.